United States Patent [19]
Baylor et al.

[11] Patent Number: 6,094,709
[45] Date of Patent: Jul. 25, 2000

[54] CACHE COHERENCE FOR LAZY ENTRY CONSISTENCY IN LOCKUP-FREE CACHES

[75] Inventors: Sandra Johnson Baylor, Ossining; Anthony Simon Bolmarcich, Carmel; Yarsun Hsu, Pleasantville; Ching-Farn Eric Wu, Yorktown Heights, all of N.Y.

[73] Assignee: International Business Machines Corporation, Armonk, N.Y.

[21] Appl. No.: 08/886,222

[22] Filed: Jul. 1, 1997

[51] Int. Cl.[7] .................................................. G06F 12/00
[52] U.S. Cl. ........................... 711/141; 711/118; 711/119; 711/147
[58] Field of Search ................................... 711/118, 119, 711/141, 144, 152, 147, 121, 163

[56] References Cited

U.S. PATENT DOCUMENTS

| | | | |
|---|---|---|---|
| 4,747,043 | 5/1988 | Rodman | 711/124 |
| 5,075,846 | 12/1991 | Reininger et al. | 711/151 |
| 5,197,146 | 3/1993 | LaFetra | 711/144 |
| 5,226,143 | 7/1993 | Baird et al. | 711/145 |
| 5,303,362 | 4/1994 | Butts, Jr. et al. | 711/121 |
| 5,404,482 | 4/1995 | Stamm et al. | 711/145 |
| 5,428,761 | 6/1995 | Herlihy et al. | 711/145 |
| 5,684,977 | 11/1997 | Van Loo et al. | 711/143 |
| 5,778,437 | 7/1998 | Baylor et al. | 711/141 |
| 5,822,763 | 10/1998 | Baylor et al. | 711/141 |
| 5,887,146 | 3/1999 | Baxter et al. | 710/104 |
| 5,900,015 | 5/1999 | Herger et al. | 711/141 |
| 5,960,461 | 9/1999 | Frank et al. | 711/163 |

OTHER PUBLICATIONS

Hoichi Cheong et al., "A Cache Coherence Scheme with Fast Selective Invalidation", University of Illinois at Urbana–Champaign, IEEE Transactions, pp. 299–307, Feb. 1997.

Anoop Gupta et al., "Cache Invalidation Patterns in Shared–Memory Multiprocessors", IEEE Transactions on Computers, pp. 794–810, 1992.

A. Agarwal, R. Simoni, J. Hennessy, and M. Horowitz, "An Evaluation of Directory Schemes for Cache Coherence," International Symposium on Computer Architecture, pp. 280–289, 1988.

H. Attiya and J. L. Welch, "Sequential Consistency Versus Linearizability," ACM Transactions on Computer Systems, 12(2): 91–122, May 1994.

S. J. Baylor, K. P. McAuliffe, and B. D. Rathi, "An Evaluation of Cache Coherence Protocols for Min–Based Multiprocessors," International Symposium on Shared Memory Multiprocessing, pp. 230–241, Apr. 1991.

B. Bershad, M. Zekauskas, and W. Sawdon, "The Midway Distributed Shared Memory System," Proc. IEEE COMPCON Conference, pp. 528–537, 1993.

K. Gharachorloo et al, "Memory Consistency and Event Ordering in Scalable Shared Memory Multiprocessors," Proc. 17th International Symposium on Computer Architecture, pp. 15–26, 1990.

(List continued on next page.)

*Primary Examiner*—John W. Cabeca
*Assistant Examiner*—Pierre-Michel Bataille
*Attorney, Agent, or Firm*—Wayne Ellenbogen; Anne Vachon Dougherty

[57] ABSTRACT

A method of reducing false sharing in a shared memory system by enabling two caches to modify the same line at the same time. More specifically, with this invention a lock associated with a segment of shared memory is acquired, where the segment will then be used exclusively by processor of the shared memory system that has acquired the lock. For each line of the segment, an invalidation request is sent to a number of caches of the system. When a cache receives the invalidation request, it invalidates each line of the segment that is in the cache. When each line of the segment is invalidated, an invalidation acknowledgement is sent to the global directory. For each line of the segment that has been updated or modified, the update data is written back to main memory. Then, an acquire signal is sent to the requesting processor which then has exclusive use of the segment.

9 Claims, 4 Drawing Sheets

OTHER PUBLICATIONS

L. I. Kontothanassis, M. L. Scott, and R. Bianchini, "Lazy Release Consistency for Hardware–Coherent Multiprocessors," Proc. Supercomputing '95, 1995.

A. Saulsbury, T. Wilkinson, J. Carter, and A. Landin, "An Argument for Simple Coma," Proc. First Symposium on High–Performance Computer Articture, pp. 276–285, 1995.

Shigeki Shibayama et al., "An Optical Bus Computer Clusterwith A deferred Cache Coherence Protocol", Media Technology Laboratory, IEEE Transactions, pp. 175–182, Jun. 1996.

Leonidas I Kontothenassis et al., Lazy Release Consistency for Hardware–Coherent Multiprocessors, University of Rochester, 1994.

Karin Patersen et al., "Cache Coherence for Shared Memory Multiprocessors Based on Virtual Memory Support", Princeton University, IEEE Transactions, pp. 49–55, 1993.

Manu Thapar et al., "Distrubuted Directory scheme: Stanford Distrubuted Directory Protocol", University of Southern California, Computer, pp. 78–80, Jun. 1990.

CACHE COHERENCE FOR LAZY ENTRY CONSISTENCY IN LOCKUP-FREE CACHES

DESCRIPTION

1. Technical Field

This invention relates to a method and apparatus for providing cache coherency in a shared memory system.

2. Description of the Prior Art

In a shared memory multiprocessor, one of the most important factors to consider when designing for high-performance is the memory consistency model. False sharing, resulting in unnecessary invalidations and potentially prohibitive performance may result when using some consistency models. Relaxed consistency models are becoming widely accepted memory models for shared memory multiprocessors. This is basically due to their high performance potential relative to the traditional sequential consistency (SC) memory model [2]. Two of the most popular models are release consistency (RC) [5] and entry consistency (EC) [4] In a sequentially consistent system, the result of any execution is the same as if the operations of all processors were executed in some sequential order, and the operations of each individual processor appear in this sequence in the order specified by the program.

Release consistency uses the notion of acquire and release to specify the acquisition and release of a lock, respectively, to critical sections of code that accesses shared data. This facilitates the relaxation of the ordering of memory accesses, resulting in possible out-of-order executions. For example, a release operation may be outstanding when an acquire is issued. The release, a signal to other processors, has nothing to do with the acquire, a reading of a signal from another processor. The acquire is considered as a blocking operation, and release can be considered as a non-blocking operation. Also, at an acquire operation, it is not a requirement that all outstanding shared memory accesses complete before the acquire is started. For example, a processor writes into a flag to indicate a certain operation has completed and tries to acquire a shared resource.

There is no reason for the processor writing the flag to wait for the writing to complete. Furthermore, normal shared accesses after a release operation are not delayed if the release has not completed. Again, a release is a signal to other processors, so its lack of completion should not cause the processor issuing it to stall.

There are two basic implementation strategies for release consistency; eager and lazy release consistency. Lazy release consistency is based upon the semantics of what an acquire and release mean to a program. Since a processor accessing data that has been updated by another processor will always do an acquire to insure it is seeing the updated data, there is no need for all accesses that appear before a release to be visible to all processors at the time of the release (as is the case for eager release consistency). The propagation of modifications is therefore postponed until the time of the acquire, and only with respect to the processor doing the acquire. Lazy release consistency exhibits potentially better performance; however, its implementation are hardware is very complex.

In entry consistency, all shared data must be associated with a synchronization object that protects access to that shared data. Acquire and release are also used in this consistency model. After completing an acquire, entry consistency guarantees that a process sees the most recent version of the data associated with the acquired synchronization variable. In addition, acquiring a synchronization variable for exclusive access (i.e., acquire for write) is distinguished from acquiring it for non-exclusive accesses (i.e. acquire for read). Associating with each synchronization variable a list of normal shared variables reduces the overhead associated with acquiring and releasing a synchronization variable, since only a few shared variables have to be synchronized. It also allows multiple critical sections involving disjoint shared variables to execute simultaneously, increasing the amount of parallelism. False sharing is reduced, and can be totally eliminated in an entry consistency system. Entry consistency also has eager and lazy implementations.

SUMMARY OF THE INVENTION

It is an object of this invention to reduce false sharing in a shared memory system by enabling two distinct caches in a shared memory multiprocessor (i.e., two L2 caches) of FIG. 1 to modify the same line at the same time.

Accordingly, this invention is a method of acquiring a lock associated with a segment of shared memory, where the segment will be used exclusively by the processor of the shared memory system having acquired the lock. With this invention, for each line of the segment an invalidation request is sent to a number of caches of the system. When each cache receives the invalidation request, it invalidates each line of the segment that is in the cache. When each line of the segment is invalidated, an invalidation acknowledgement is sent to the global directory. For each line of the segment that has been updated or modified, the update data is written back to main memory. Finally, an acquire grant signal is sent to the requesting processor which then has exclusive use of the segment.

In a more specific embodiment of this invention, the acquire grant signal will not be sent to the requesting processor until after all the invalidation acknowledgements or updates have been received by the global directory.

DESCRIPTION OF THE PREFERRED EMBODIMENT

Figure 1A:
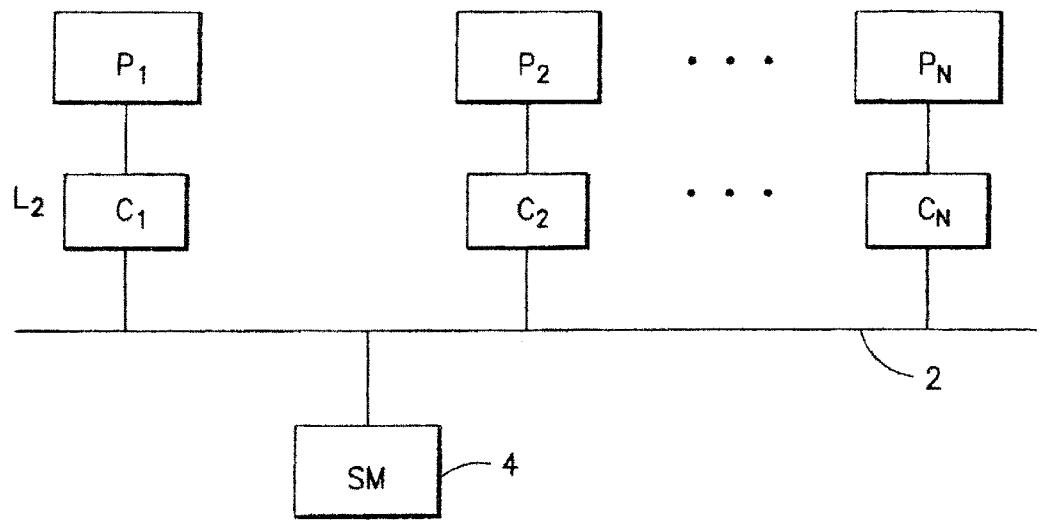
FIG. 1A schematically illustrates a typical system configuration in which this invention is implemented, while FIG. 1B schematically illustrates an alternative network configuration in which the invention can be implemented.

Shown if FIG. 1A is a typical system configuration in which the invention can be implemented. Shown are processors P1, P2, $P_N$, where each processor has its own level 2 cache. The caches are shown respectively as caches C1, C2, ..., $C_N$. The caches and the processors are interconnected to each other through a system bus 2 to which a shared memory 4 is also connected.

Figure 1B:
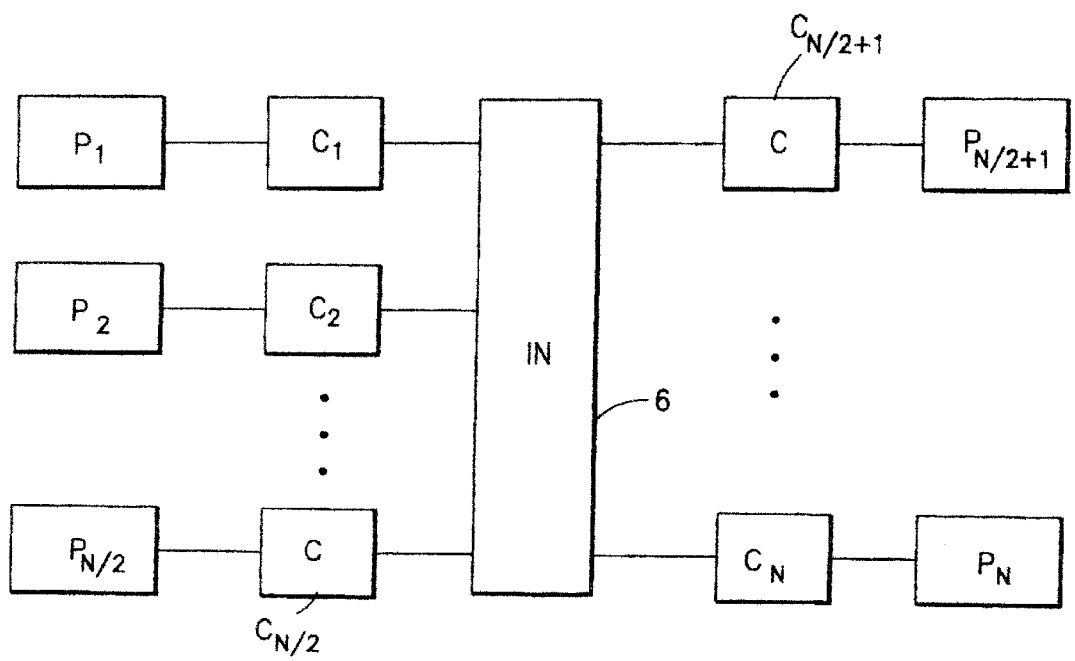

FIG. 1B schematically illustrates an alternative network configuration to FIG. 1A, where the system bus 2 is replaced by the interconnection network 6, which could be typically an omega network. Shown also are processors P1, P2, $P_N$ which are connected to the interconnection network. Also shown are the caches for each processor, where these caches are also connected to the interconnection network. See caches C1, C2, ..., $C_N$.

Figures 2A, 2B:
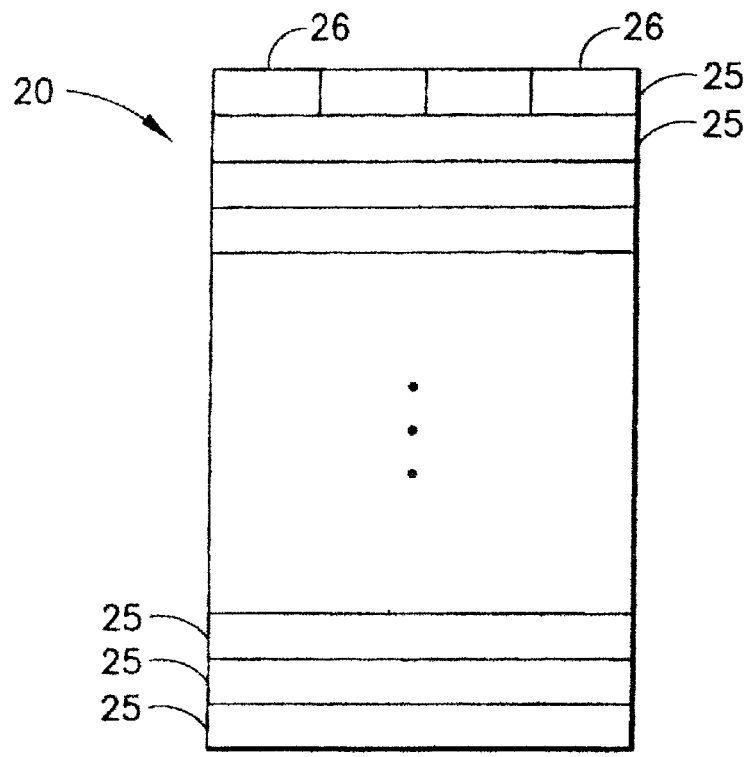
FIG. 2A schematically illustrates a segment of data for which a lock can be acquired, and FIG. 2B graphically illustrates the format of the cache directory.

Shown in FIG. 2A is a typical segment 20 of data for which a lock can be acquired for exclusive use by one of the processors of the shared memory system. Shown are lines 25, where each line comprises a number of words 26.

FIG. 2B illustrates the format of the cache directory 28, where the state of each line in a segment is maintained. The states that each line can assume will be described below. It is assumed that each processor has its own private cache that includes local state information for cache coherence. Also, there is a global distributed directory that holds global state information of every cacheable line. Examples of locations for the directory include its association with the memory modules of a shared-memory multiprocessor or with the home node of a multiple-node system where each node is an SMP. It is also assumed that the private caches are lockup-free and that some mechanism exists to ensure that requests that arrive out of order from the directory are processed in the intended order. A lockup-free cache facilitates the execution of out-of-order memory accesses. In high performance shared memory multiprocessors, there are multiple paths in a network between a source and destination. Therefore, some requests may arrive at a destination out of order. There are a number of methods that may be used by a network adapter protocol to guarantee that these requests are processed by the destination node in the order intended. These protocols are orthogonal to the disclosed invention; however, it is assumed that one is used.

In lazy entry consistency, when a processor issues a release, it is assumed that the release operation does not complete until all outstanding operations to data associated with the lock on which the release is issued are is performed by the issuing processor. Therefore, when a processor issues a release, it stalls until all outstanding requests for the associated data are completed by the processor. When the processor reaches an acquire operation, it is not performed until the outstanding operations on the associated data are performed by the processor issuing the most recent release operation on the data with respect to the processor issuing the acquire. The disclosed invention implements the acquire methodology in two steps. First, anytime a processor modifies shared data, it sends a write notice to the directory (the directory has information that identifies which caches have copies and modified copies of the line). A processor issuing a successful acquire sends it to the directory, which will then send an invalidation signal to all caches that have modified copies of all shared lines associated with the lock. These caches will then invalidate their copies of the line and then send invalidation acknowledgements to the directory or to the processor issuing the acquire, along with any modified data. If the acknowledgements go to the directory, then the directory sends a signal to the requesting processor (indicating that it is safe to proceed with the completion of the acquire). Otherwise, the directory will send a signal to the processor with information on the number of invalidation acknowledgements to receive. The processor will then proceed with the completion of the acquire after it has received the appropriate number of acknowledgements.

There are two embodiments of the write notice implementation. First, a write notice can be sent to the directory on the first write to the cache line. Second, all write notices are sent when the processor issues a release. There are modified bit vectors associated with every cache line to flag the modified words within a line. Therefore, when the processor issues the release, all cache lines with at least one modified bit set, will send a write notice to the directory. In the remainder of this disclosure we discuss the first alternative; however, we want to emphasize the fact that both of these implementations are disclosed.

In this embodiment, we focus our descriptions on architectures that include a main memory (i.e., CC-NUMA [8]). However, this protocol can also be implemented in architectures where there is no notion of main memory, i.e., COMA [7]. Here, data is written to or accessed from the L3 cache of the requesting node.

Figure 3:
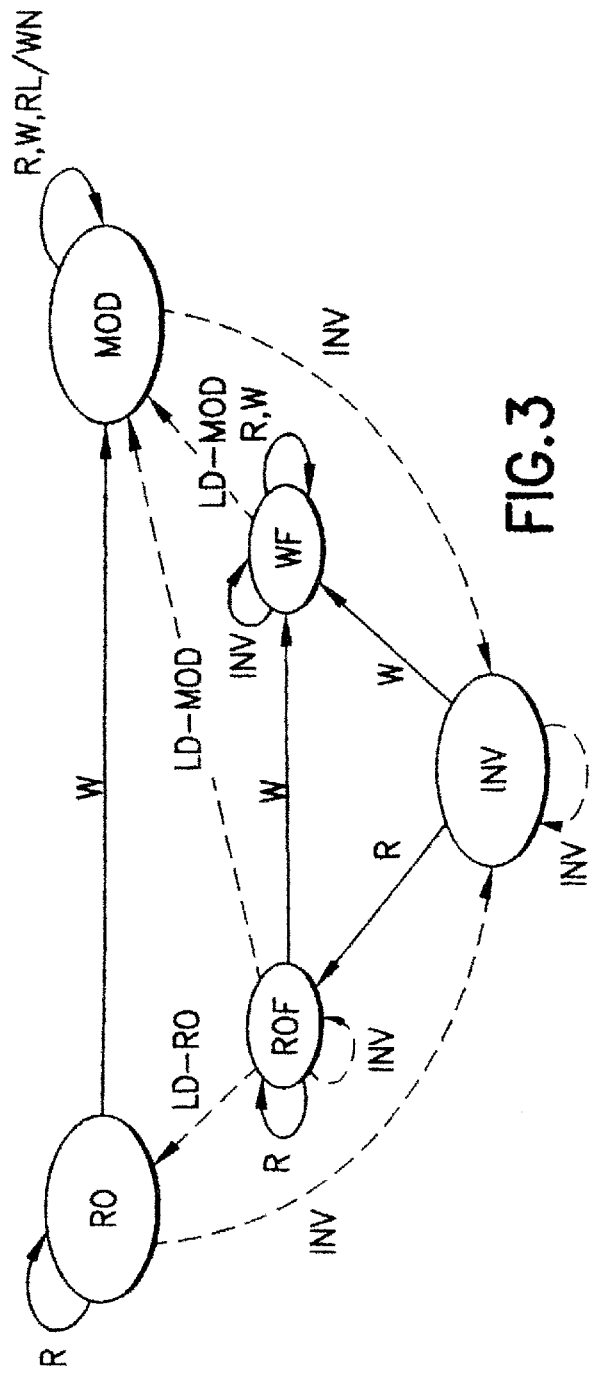
FIG. 3 is the coherence state diagram for a line in the local cache.

Shown in FIG. 3 is the coherence state diagram for a line in the local cache. It consists of three permanent states and two transient states as outlined below:

Permanent States
  RO—Read-only. The cache line is present and it has not been modified.
  MOD—Modified. The cache line is present and it has been modified.
  INV—Invalid. Space has been allocated in the cache for the line; however, the data is not valid.
Transient States
  ROF—Read-only Filling. A read miss occurred for the cache line, space has been allocated for the line, a memory request has been sent to obtain a copy of the line, and the cache is awaiting the data transfer.
  WF—Write Filling. A write miss occurred for the cache line, space has been allocated for the line, a memory request and write request have been sent, and the cache is awaiting the data transfer.

The cache line is in a transient state as a result of a cache miss. A request is sent for the data; however, since the cache is lockup-free, the processor does not stall until the miss processing completes. Once the data arrives, the local line state is changed to a permanent state.

In all cases when all invalidation acknowledgements or updates have been received then an acquire granted signal is sent to the requesting processor.

There are several signals that may trigger coherence action in the local (private) cache. They include a read or write miss (resulting from the issuance of processor reads and writes, respectively), and load read-only (LD-RO), load-modified (LD-MOD), and invalidation signals received from the global directory. Described below are the actions taken as a result of these events when the local cache line is in one of the five states outlined above.

Invalid (INV).
If the processor issues a read request while in this state, the state is changed to ROF. Also, a request is sent to memory to transfer the line. Also, a signal is sent to the global directory, informing it that the associated processor has requested the line. If the processor issues a write request while in this state, the state is changed to WF. A request is also sent to memory and the global directory. A request is sent to memory for the cache line and a write notice is sent to the global directory so it can update its information concerning which caches have copies of the line. Also, some further coherence action may be needed, depending upon the global state of the line (see discussion below on the directory protocol). If the global directory issues an invalidate signal while in the state, the state is unchanged.

Read-only (RO).
This state remains RO if the processor issues a read. The state is changed to MOD if the processor issues a write. A write notice signal is also sent to the global directory indicating the associated processor has now modified the line. No further coherence activity is needed. This is different from traditional cache coherence protocols (implementing sequential consistency) because several processors may now have modified copies of the line. This, however, does not violate the lazy entry consistency protocol because any exclusive shared read/write access to data is assumed to be associated with a lock for that data. If an invalidate signal is received from the global directory, then the state of the line is changed to INV. Also, an invalidation acknowledgement is sent either to the directory or to the remote cache attempting to access the lock associated with the shared data contained in the line (see below for details).

Modified (MOD).

This state remains MOD if the processor issues a read or write. The state is changed to INV if it receives an INV signal from the global directory. Also, the modified line is written back to memory if a write-back (WB) signal is received.

Read-only Filling (ROF).

If the processor issues a read to the line, the state will remain ROF. If the processor issues a write to the line, the state will change to write filling (WF). This is because a write is now outstanding, in addition to the line. Also, a write notice is sent to the directory. The state is unchanged if an invalidation signal is received. If a LD-RO signal is received from the directory/memory, then the state of the line is changed to RO. This indicates that a remote cache also has a copy of the line.

Write Filling (WF).

The state of this line is unchanged if the processor issues a read or write or if it receives an invalidate signal from the directory. The state is changed to MOD when it receives the LD-MOD signal (and associated cache line) from the directory and memory.

Figure 4:
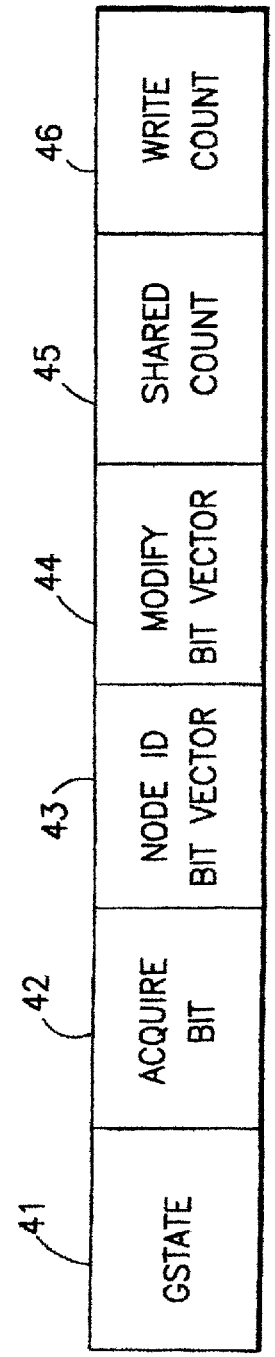
FIG. 4 graphically illustrates an entry in the global.
Figure 5:
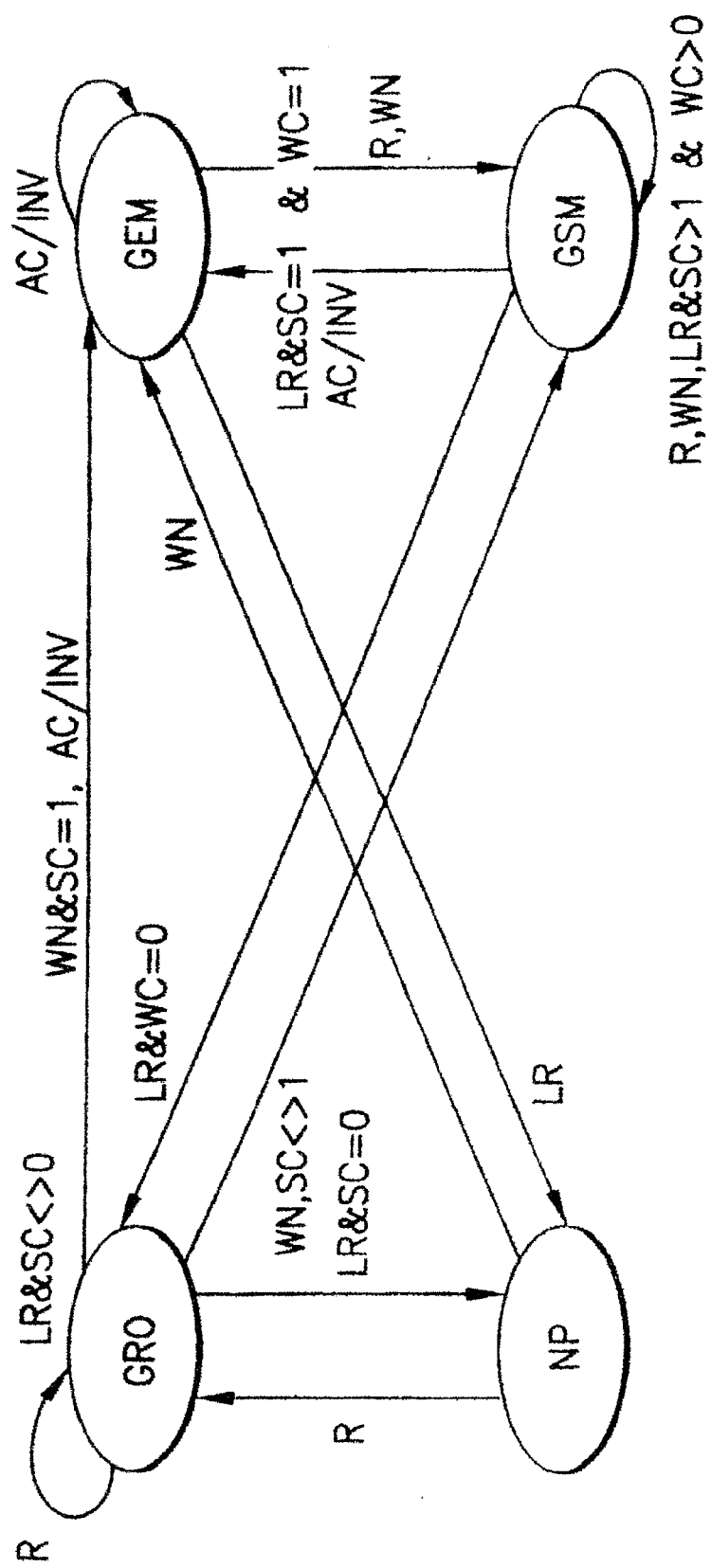
FIG. 5 is the global state diagram for a line in the global directory.

Referring to FIG. 4, each entry in the global directory contains the global state of the line 41 and node identifiers 43 indicating the nodes (private caches) with copies of the line. Also associated with each identifier is a modify bit 44 used to determine if the node has modified the line and two counters; a shared counter (SC) 45 and a write counter 46 (WC) that specifies the number of nodes sharing and writing the line, respectively.

Shown in FIG. 2 is the global state diagram for a line. It consists of four states as outlined below:

GRO (Global Read-only)—the line is present and unmodified in at least one private cache
GEM (Global Exclusive Modified)—the line is present and modified in only one cache
GSM (Global Shared Modified)—the line is present in at least two private caches and at least one of them has modified the line.
NP (Not Present)—the line is not present in any cache.

There are several signals that may trigger coherence action by the global directory. They include read and write requests, write notices, line replacements in the cache (LR), and acquires. Described below are the actions taken as a result of these events when the line is in one of the four global states outlined above.

Global Read-only (GRO).

If a read is processed while in this state the global state is unchanged. If a line replacement (LR) signal is processed, the state will change to NP if no other caches have a copy of the line. Otherwise, the state remains unchanged. If a write or write notice signal is processed, the state of the line is changed to GSM if more than one copy of the line exists in the private caches. The state is changed to GEM if only one copy of the line exists and that copy is the one to be modified. If an acquire signal is received, the state of the line is changed to GEM and invalidation signals are sent to all nodes with copies of the line. Invalidation acknowledgements are either sent to the directory or to the requestor. If they are received by the directory, then the directory will wait until all have been received and then signal the requestor that the acquire processing has completed. If they are received by the requestor, then the directory will send a response to the acquire immediately after sending the invalidation signals to the nodes with a copy of the line. This response will indicate the number of acknowledgements to be received by the requestor. The acquire completes only after the requestor receives all invalidation acknowledgements from the appropriate nodes. In all cases, the global directory is updated to reflect the identities and number (shared count or SC) of private caches with a copy of the line and the number with modified copies (write count or WC).

Global Exclusive Modified (GEM).

A line in this state will change to the GSM state if a read, write, or write notice is processed by the directory. The state changes to NP if a LR signal is processed (this will be accompanied by a write back of the modified line). If an acquire signal is processed, then the state will remain GEM; however, an invalidation signal is sent to the node with the copy of the line. The modified line (and its associated modified word bit vector) is then written back to memory (with an associated signal to the directory) or to the requester. The completion of the acquire will then occur as described above. In all cases, the global directory is updated to reflect the identities and number (shared count or SC) of private caches with a copy of the line and the number with modified copies (write count or WC).

Global Shared Modified (GSM).

If a read, write, or write notice request is processed while in this state, the state will be unchanged. If a line replaced (LR) signal is received, the state is changed to GEM if only one modified copy of the line remains. Also, the state is changed to GRO if no modified copies remain and it is unchanged if at least two copies of the line remain and at least one is a modified copy. If an acquire is processed while in this state, the directory will send invalidation signals to all nodes with copies of the line. For those nodes with read-only copies of the line, invalidation acknowledgements are then sent to the directory or to the requestor. For nodes that have modified words within the line, the line (along with a bit vector of modified words within the line) is either written back to main memory (with an accompanying signal sent to the directory) or to the requester. Completion of the acquire processing will occur as described above.

Not Present (NP).

If a write or occurs while in this state, the new state is GEM. If a read request is processed while in this state, the new state is GRO.

References

1. A. Agarwal, R. Simoni, J. Hennessy, and M. Horowitz, "An Evaluation of Directory Schemes for Cache Coherence," International Symposium on Computer Architecture, pp. 280–289, 1988.
2. H. Attiya and J. L. Welch, "Sequential Consistency Versus Linearizability," ACM Transactions on Computer Systems, 12(2):91–122, May 1994.
3. S. J. Baylor, K. P. McAuliffe, and B. D. Rathi, "An Evaluation of Cache Coherence Protocols for Min-Based Multiprocessors," International Symposium on Shared Memory Multiprocessing, pp. 230–241, April 1991.
4. B. Bershad, M. Zekauskas, and W. Sawdon, "The Midway Distributed Shared Memory System," Proc. IEEE COMPCON Conference, pp. 528–537, 1993.

5. K. Gharachorloo et al, "Memory Consistency and Event Ordering in Scalable Shared Memory Multiprocessors," Proc. 17th International Symposium on Computer Architecture, pp. 15–26, 1990.
6. L. I. Kontothanassis, M. L. Scott, and R. Bianchini, "Lazy Release Consistency for Hardware-Coherent Multiprocessors," Proc. Supercomputing '95, 1995.
7. A. Saulsbury, T. Wilkinson, J. Carter, and A. Landin, "An Argument for Simple Coma," Proc. First Symposium on High-Performance Computer Architecture, pp. 276–285, 1995.
[8] T. Lovett, R. Clapp, "STiNG: A CC-NUMA Compute System for the Commercial Marketplace," 23rd Annual International Symposium on Computer Architecture" May 1996.

Having thus described our invention, what we claim as new and desire to secure by Letters Patent is:

1. In a shared memory system having a plurality of processors, each processor having an associated cache, a method of acquiring a lock associated with a segment comprising more than one cache line stored in more than one cache for exclusive use by a requesting one of said processors, said method comprising:
   a. for each line of said segment, sending an invalidation request to each cache of said system having a line in said segment;
   b. for each line of said segment, sending an invalidation acknowledgement to a global directory in response to said invalidation request;
   c. for each line of said segment, writing back update data of each of said cache lines within said segment which have previously been modified; and
   d. sending an acquire grant signal to said requesting processor, thereby granting exclusive use of said segment to said requesting processor.

2. A method as recited in claim 1, wherein said update data is written back to main memory.

3. In a shared memory system having a plurality of processors, each processor having an associated cache, a method of acquiring a segment comprising more than one cache line stored at more than one cache for exclusive use by a requesting one of said processors, said method comprising:
   a. for each line of said segment, sending an invalidation request to each cache of said system having a line in said segment if there are no pending acquires for each said line;
   b. for each line of said segment, sending an invalidation acknowledgement to a global directory in response to said invalidation request;
   c. for each line of said segment, writing back update data of each of said cache lines of said segment that have previously been modified, and
   d. sending an acknowledgement grant signal to said requesting processor, thereby granting exclusive use of said segment to said requesting processor.

4. In a shared memory system having a plurality of processors, each processor having an associated cache, a method of acquiring a segment comprising more than one cache line stored in more than one cache for exclusive use by a requesting one of said processors, said method comprising:
   a. for each line of said segment, sending an invalidation request to each cache of said system having a line in said segment, wherein each cache receiving said invalidation requests invalidates each line of said segment that is in each cache; and
   b. for each line of said segment, writing back update data of each of said cache lines of said segment that have previously been modified.

5. In a shared memory system having a plurality of processors, each processor having an associated cache, a method of acquiring a segment comprising more than one cache line stored at more than one cache for exclusive use by a requesting one of said processors, said method comprising:
   a. for each line of said segment, sending a write back request to each cache of said system having a line in said segment;
   b. for each line of said segment, sending write back updated data to a global directory; and
   c. invalidating each line in said segment that is present in said cache of said requesting processor.

6. In a shared memory system having a plurality of processors, each processor having an associated cache, a method of acquiring a lock associated with a segment of shared memory for exclusive use by one of said processors, said method comprising:
   a. for each line of said segment, sending an invalidation request to a number of caches of said system, wherein each cache receiving said invalidation requests invalidates each line of said segment that is in each cache;
   b. for each line of said segment that was invalidated in step (a) sending an invalidation acknowledgement to a global directory in response to said invalidation request:
   c. for each line of said segment, writing back update data for each of said cache lines that have been modified; and
   d. sending an acquire grant signal to said requesting processor thereby granting exclusive use of said segment to said requesting processor after all invalidation acknowledgements or updates have been received by said number of caches.

7. In a shared memory system having a plurality of processors, each processor having an associated cache, a method of acquiring a lock associated with a segment of shared memory for exclusive use by one of said processors, said method comprising:
   a. for each line of said segment, sending an invalidation request to a number of caches of said system, wherein each cache receiving said invalidation requests invalidates each line of said segment that is in each cache;
   b. for each line of said segment that was invalidated in step (a), sending an invalidation acknowledgement to a global directory in response to said invalidation request;
   c. sending an acquire grant signal to said requesting processor thereby granting exclusive use of said segment to said requesting processor after all invalidation acknowledgements have been received by said number of caches.

8. In a shared memory system having a plurality of processors, each processor having an associated cache, a method of acquiring a segment of shared memory for exclusive use by one of said processors, said method comprising;
   a. for each line of said segment, sending a invalidation request to a number of caches of said system, wherein each cache receiving said invalidation requests invalidates each line of said segment that is in each cache;
   b. for each line of said segment, writing back update data for each of said cache lines that have been modified; and c. sending an acquire grant signal to said requesting processor thereby granting exclusive use of said segment to said requesting processor after all updates have been received by said number of caches.

9. A method as recited in claim 1, further comprising the step of determining the presence of pending acquires using an acquire bit associated with each line of said segment.

* * * * *